United States Patent
Skarpness

(10) Patent No.: US 7,809,856 B2
(45) Date of Patent: *Oct. 5, 2010

(54) PRIORITIZING DATA TRANSFERS OVER DATA BUSES

(75) Inventor: Mark L. Skarpness, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1609 days.

This patent is subject to a terminal disclaimer.

(21) Appl. No.: 11/029,998

(22) Filed: Jan. 4, 2005

(65) Prior Publication Data

US 2005/0120149 A1     Jun. 2, 2005

Related U.S. Application Data

(63) Continuation of application No. 09/469,960, filed on Dec. 21, 1999, now Pat. No. 6,892,243.

(51) Int. Cl.
    *G06F 15/173* (2006.01)
(52) U.S. Cl. .................................... 709/240
(58) Field of Classification Search ............... 709/240; 710/52, 55, 58; 370/412, 463
    See application file for complete search history.

(56) References Cited

U.S. PATENT DOCUMENTS

| | | | |
|---|---|---|---|
| 4,521,882 A | 6/1985 | Gabrielli et al. | |
| 5,311,509 A * | 5/1994 | Heddes et al. | 370/397 |
| 5,917,822 A * | 6/1999 | Lyles et al. | 370/395.4 |
| 5,941,952 A | 8/1999 | Thomas et al. | |
| 6,088,734 A | 7/2000 | Marin et al. | |
| 6,205,150 B1 | 3/2001 | Ruszozyk | |
| 6,212,582 B1 | 4/2001 | Chong et al. | |
| 6,247,058 B1 | 6/2001 | Miller et al. | |
| 6,289,389 B1 | 9/2001 | Kikinis | |
| 6,401,147 B1 | 6/2002 | Sang et al. | |
| 6,427,173 B1 | 7/2002 | Boucher et al. | |
| 6,466,579 B1 | 10/2002 | Scott et al. | |
| 6,470,410 B1 | 10/2002 | Gulick et al. | |
| 6,473,815 B1 | 10/2002 | Lu et al. | |
| 6,480,911 B1 | 11/2002 | Lu | |
| 6,519,666 B1 | 2/2003 | Azevedo et al. | |
| 6,587,469 B1 * | 7/2003 | Bragg | 370/401 |

(Continued)

OTHER PUBLICATIONS

RFC 2212 entitled "Specification of Guaranteed Quality of Service", by S. Shenker et al., Sep. 1997.

*Primary Examiner*—Douglas B Blair
(74) *Attorney, Agent, or Firm*—Blakely, Sokoloff, Taylor & Zafman LLP

(57) ABSTRACT

A computer system includes a host processor and a peripheral device coupled by an attachment bus. The peripheral device transfers data to the host processor over the attachment bus using at least two types of data transfers. The peripheral device includes a classifying circuit that separates the data into a first class associated with a first type of transfer and a second class associated with a second type of transfer. The peripheral circuit also includes two queues, including a first queue that receives the first class of data from the classifying circuit and a second queue that receives the second class of data from the classifying circuit. A control circuit places data from the first queue onto the bus at a higher priority than data from the second queue is placed onto the bus.

18 Claims, 2 Drawing Sheets

U.S. PATENT DOCUMENTS 6,629,220 B1    9/2003  Dyer
6,892,243 B1 *  5/2005  Skarpness .................. 709/234
7,675,897 B2 *  3/2010  Corcoran .................... 370/349

* cited by examiner

PRIORITIZING DATA TRANSFERS OVER DATA BUSES

CROSS-REFERENCE TO RELATED APPLICATIONS

This application is a continuation application of U.S. patent application Ser. No. 09/469,960, filed Dec. 21, 1999 now U.S. Pat No 6,892,243. The disclosure of the prior application is considered part of (and is incorporated by reference in) the disclosure of this application.

TECHNOLOGICAL FIELD

This application relates to data transfers on a data bus, such as the "Universal Serial Bus" (USB) found in many personal computer systems.

BACKGROUND

Data buses are used to transfer data between devices in computer systems. In general, a data bus can transfer only a certain amount of data in a given amount of time and thus has limited "bandwidth." Some data buses, such as a "Universal Serial Bus" (USB), support more than one type of data transfer, each with its own bandwidth and priority requirements. USB, for example, supports two types of streaming transfers for bi-directional data, known as "isochronous" transfers and "bulk" transfers.

In the USB environment, isochronous transfers are used for higher priority data, such as packetized voice data, that must reach the intended target within a bounded period of time. Isochronous transfers therefore attempt to guarantee at least some minimum bandwidth on the bus. Bulk transfers, on the other hand, are used with lower priority data, such as normal Internet traffic, for which only a guarantee of delivery is required. Bulk transfers do not guarantee bandwidth or priority on the bus.

In a conventional computer system, each network-interfacing device places all traffic that arrives over the network into a single queue. For a USB device, such as a USB broadband modem, this means that all incoming data is placed in a single queue, regardless of the data's priority. Therefore, the delivery of higher priority data is often delayed by the presence of lower priority data in the queue. This makes it difficult to provide guaranteed bus bandwidth to the higher priority data.

SUMMARY

A computer system includes a host processor and a peripheral device coupled by an attachment bus. The peripheral device transfers data to the host processor over the attachment bus using at least two types of data transfers. The peripheral device includes a classifying circuit that separates the data into a first class associated with a first type of transfer and a second class associated with a second type of transfer. The peripheral circuit also includes two queues, including a first queue that receives the first class of data from the classifying circuit and a second queue that receives the second class of data from the classifying circuit. A control circuit places data from the first queue onto the bus with higher priority than data from the second queue is placed onto the bus.

Other embodiments and advantages will become apparent from the following description and from the claims.

DETAILED DESCRIPTION

Figure 1:
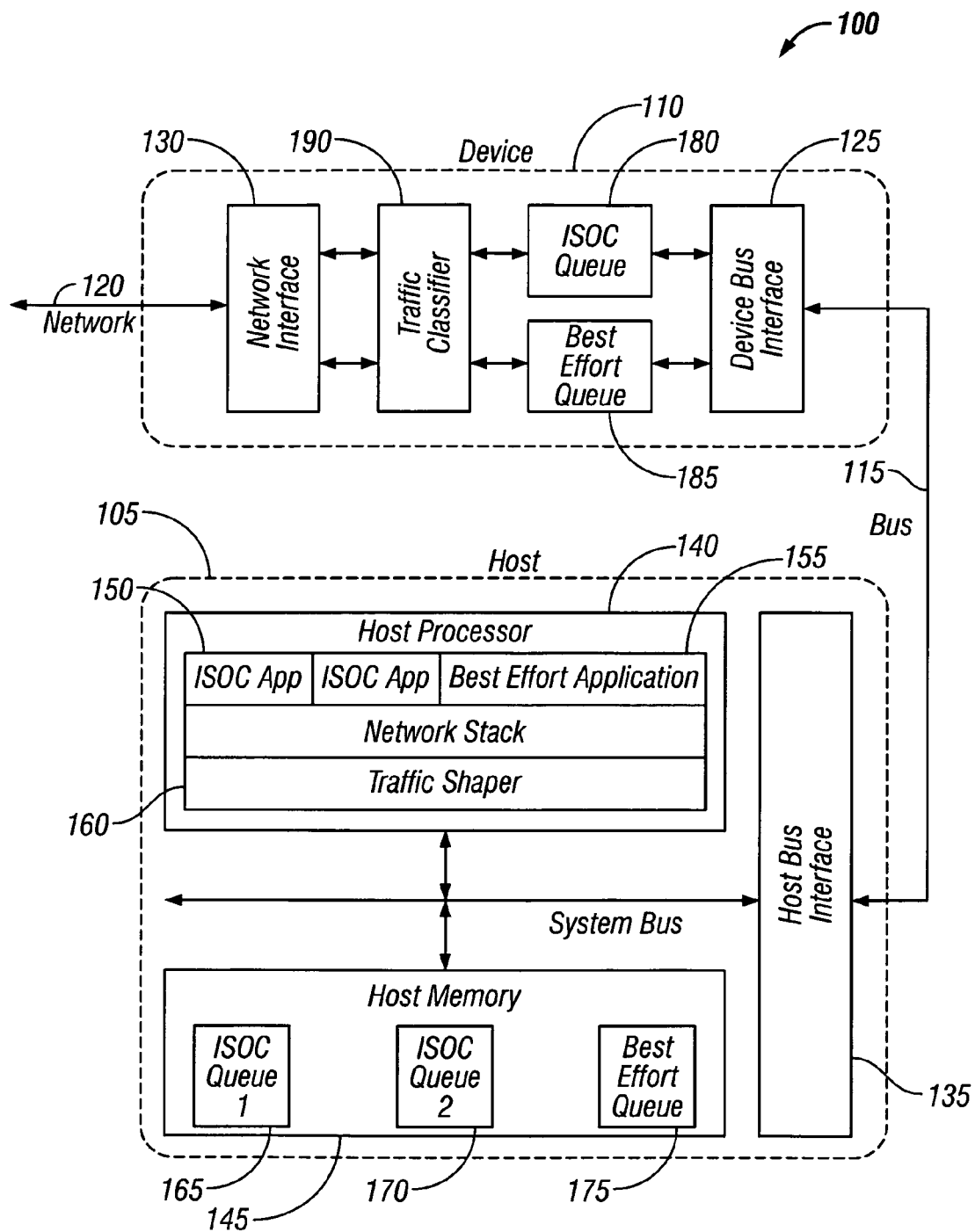
FIGS. 1 and 2 are partial block diagrams of a computer system that places incoming and outgoing network traffic into queues that indicate a priority level for each block of data.

FIG. 1 shows a computer system 100 in which a host device 105 communicates with a peripheral device 110, such as a broadband modem, over a bi-directional data bus 115, such as a "Universal Serial Bus" (USB) or a "Peripheral Component Interface" (PCI) bus. The peripheral device 110 also connects to a computer network 120, such as the Internet or a private intranet. The peripheral device includes a device-bus interface component 125 that allows the device to send and receive data over the data bus 115. Likewise, the peripheral device 110 includes a network interface component 130 that allows the device to send and receive data over the network 120. The host device 105 includes a host-bus interface 135 that allows the host device 105 to send and receive data over the data bus 115.

Some of the data flowing through the peripheral device 110 has higher priority than other data flowing through the device and therefore must be handled more reliably. For example, packetized voice data must reach its intended target in a manner that has very little, if any, effect on the reproduced sound quality. Many types of Internet traffic, on the other hand, generally does not need to reach its intended target with any particular urgency.

When the data bus 115 is a USB bus, isochronous transfers, or "guaranteed service" transfers, are used to deliver higher priority data, such as packetized voice data, between the peripheral device 110 and the host processor. USB uses bulk transfers, or "best effort service" transfers, to deliver lower priority data, such as normal Internet traffic.

The host device 105 and the peripheral device 110 both include components that distinguish between higher priority data and lower priority data. These components ensure that the higher priority data is delivered with greater reliability.

The host device 105 typically includes the computer's base board, on which a host processor 140 and host memory device 145 reside. The host processor 140 executes a variety of application programs, including applications that require guaranteed service, such as packetized voice applications 150, and programs that require only best-effort service, such as Internet browsing applications 155. The host processor 140 also implements a traffic shaping component 160, which receives data addressed to the network and separates the data into higher priority and lower priority blocks. The host processor 140 implements the application programs 150, 155 and the traffic shaping component 160 by retrieving executable instructions from a storage device, such as the host memory device 145, and executing these instructions.

The host memory device 145 includes storage elements that are partitioned to form two or more data queues 165, 170, 175. At least one queue is a "highest priority" queue 165 dedicated to storing data generated by or intended for one of the higher priority applications 150, and at least one queue is a "low priority" queue 175 dedicated to storing data generated by or intended for the lower priority applications 155. In some embodiments, one queue is an "elevated priority" queue 170 dedicated to storing data that is high priority, but that is not as high priority as the data stored in the highest priority queue 165.

For example, in some embodiments the highest priority queue 165 stores data that must be delivered at a constant bit rate. This data requires the guarantee of a fixed bus bandwidth. The elevated priority queue 170 stores data that can be delivered at a variable, but bounded, bit rate. This data requires the guarantee of some minimum bus bandwidth. The low priority queue 175 stores data that can be delivered at an unspecified bit rate and thus requires no guarantee of bus bandwidth.

The peripheral device 110 also includes at least two queues, including a "higher priority" queue 180 that stores higher priority data and a "lower priority" queue 185 that stores lower priority data. Data flowing into the peripheral device 110 through the network interface component 120 passes through a traffic classifier component 190. This component separates the incoming data blocks into higher priority and lower priority streams and feeds the streams to the appropriate queues. The device-bus interface 125 places data from the queues 180, 185 onto the data bus 115 in a manner that honors the bandwidth and priority requirements of the data. In general, a minimum amount of data is pulled from the higher priority queue 180 during each time cycle of some predefined length.

Data flowing into the peripheral device through the device-bus interface 125 arrives from the host device 105. In some embodiments, the peripheral device includes another traffic classifier between the device-bus interface 125 and the queues 180, 185. In most embodiments, however, the host-bus interface 135 in the host device 105 produces a signal indicating the priority of each block of data, so a traffic classifier is not needed between the device-bus interface 125 and the queues 180, 185. The device-bus interface 125 simply directs the incoming data blocks to the appropriate queues based upon the content of this signal.

Figure 2:
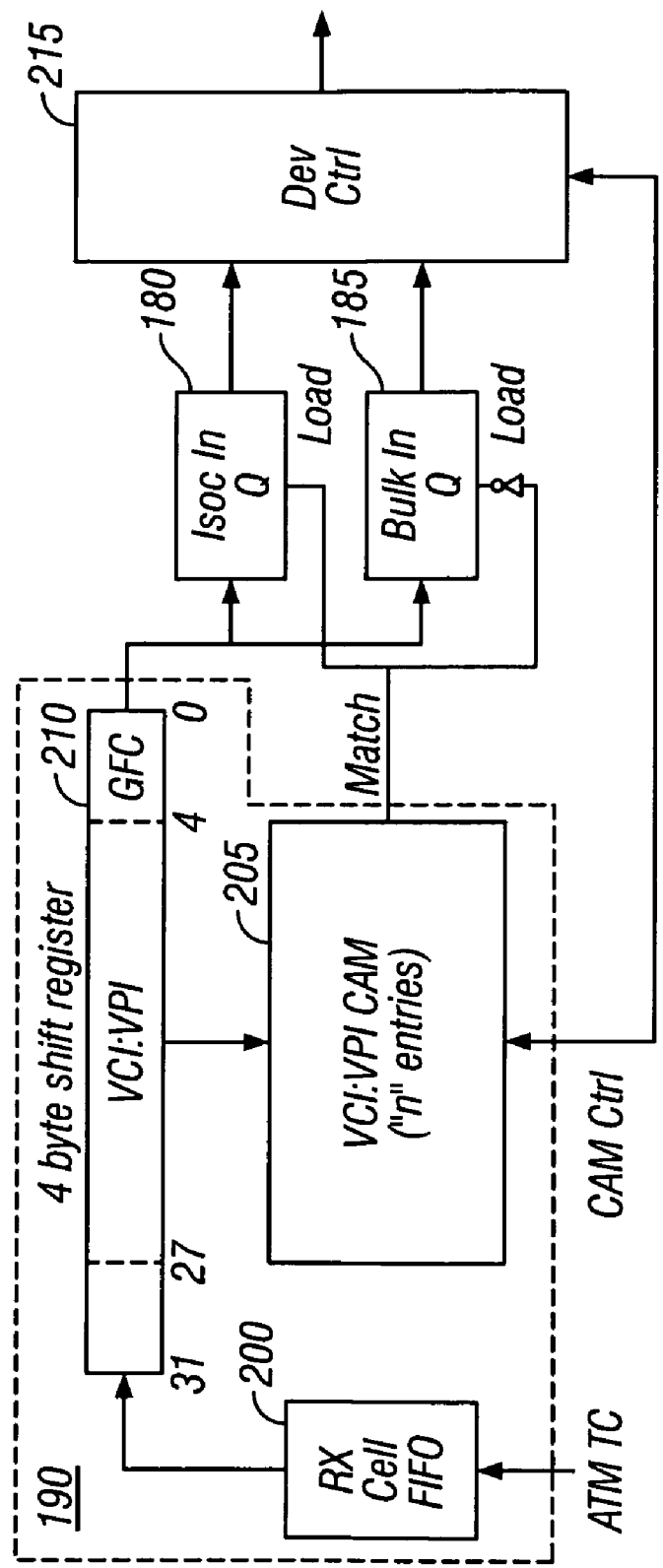

FIG. 2 shows one implementation of the traffic classifier component 190 in the peripheral device. This implementation is designed for use with an "Asynchronous Transfer Mode" (ATM) network and a "Universal Serial Bus" (USB).

Data arriving through the network interface component 130 (FIG. 1) enters a first-in-first-out (FIFO) buffer 200 that holds one data packet, or "cell." In an ATM environment, each cell includes 53 bytes of data arranged in a commonly-defined configuration. Of the 53 bytes in each cell, four bytes carry a header that, among other things, indicates the packet's virtual channel identifier and Virtual Path Identifier (VCI:VPI). The VCI:VPI typically occupies bits 4-27 in an ATM cell.

In general, all ATM data cells at a particular priority level are transferred over a known set of virtual channels. Therefore, the peripheral device can derive each cell's priority level based upon the VCI:VPI encoded in the cell's header. The priority level associated with each virtual channel is stored in a content addressable memory (CAM) device 205 in the peripheral device.

The FIFO buffer 200 transfers the incoming data, one bit at a time, into a four-byte shift register 210. Therefore, in an ATM environment, bits 4-27 in the shift register contain a VCI:VPI once every 53 bytes. The CAM device 205 is programmed to retrieve the VCI:VPI from each data packet by loading these 24 bits once every 53 bytes. Upon loading the VCI:VPI from a data packet, the CAM device 205 compares the packet's VCI:VPI to each of the stored VCI:VPI's that are associated with higher priority cells. If the packet's VCI:VPI matches one of the stored VCI:VPI's, the CAM device 205 enables the higher priority queue 180 and disables the lower priority queue 185, so the incoming packet is stored in the higher priority queue 180. If the packet's VCI:VPI does not match any of the stored VCI:VPI's, the CAM device enables the lower priority queue 185 and disables the higher priority queue 180, and the packet is stored in the lower priority queue 185.

A device controller 215 in the device-bus interface component 125 (FIG. 1) controls the flow of data from the queues 180, 185 to the data bus. The device controller 215 awards control of the USB to the higher priority queue 180 once each time cycle, e.g., once every millisecond. The device controller 215 awards control of the data bus to the lower priority queue 185 only when the bus is otherwise unoccupied. In this manner, the peripheral device guarantees that higher priority data is delivered at some minimum rate.

A number of embodiments of the invention are described above. A person of ordinary skill will recognize that various modifications are possible without departing from the spirit and scope of the invention. Accordingly, other embodiments are within the scope of the following claims.

What is claimed is:

1. A computer system, comprising:
   a peripheral device;
   a host device;
   a data bus in communication with the peripheral device and the host device, wherein the computer system further includes:
   a traffic classifier having a memory to store a priority level associated with virtual channel information of a data packet, the traffic classifier configured to:
     place data packets into a plurality of data queues including a first queue and a different queue, the traffic classifier places data packets based on a traffic classification of the data packets and with the traffic classification of the data packets indicative of a priority of the data packets, and with the first queue associated with a highest priority traffic classification; and
     determine the traffic classification of the data packets based at least in part on at least one of a virtual channel identifier and a virtual path identifier of the data packet; and
   a controller configured to control flow of data from the plurality of data queues to the data bus during data placement time cycles, wherein the controller is configured to place at least some data from the first queue on the data bus during each data placement time cycle when the first queue includes at least some data to be transmitted on the data bus, and the controller is further configured to place data from the different queue on the data bus when the first queue does not include data to be transmitted on the data bus.

2. The system of claim 1, wherein the data placement time cycles are of a predetermined length.

3. The system of claim 1, wherein the peripheral device includes a network interface in communication with a network.

4. The system of claim 1, wherein the traffic classifier is included in at least one of the host device and the peripheral device.

5. The system of claim 1, wherein the highest priority traffic classification is associated with a minimum data transfer rate, and wherein the controller is configured to place data from the first queue on the data bus at a rate equal to or greater than the minimum data transfer rate.

6. The computer system of claim 1, wherein the memory comprises a content addressable memory.

7. The computer system of claim 1, wherein the traffic classifier enables the first queue and disables the different queue based on the virtual channel information of the data packet.

8. The computer system of claim 1, wherein the traffic classifier places isochronous data in the first queue and places bulk data in the different queue.

9. A method comprising:
receiving data packets from a network at a peripheral device included in a computer system;
determining a traffic classification of the data packets to be one of a traffic classification included in a range from a highest priority traffic classification to a lowest priority traffic classification, the traffic classification based at least in part on at least one of a virtual channel identifier and a virtual path identifier of a data packet;
storing, in a memory, a priority level associated with virtual channel information of a data packet;
if the traffic classification of the data packets is a highest priority traffic classification, placing the data packets in a first queue of a plurality of queues;
if the traffic classification of the data packets is not the highest priority traffic classification, placing the data packets in a different queue of the plurality of queues; and
transmitting the data packets from the first queue and the different queue to a host device; wherein the transmitting comprises:
during each of a plurality of data transfer time cycles, placing at least some data from the first queue on a data bus in communication with the host device and the peripheral device until the first queue does not include data to be transmitted to the host device, and placing data from the different queue on the data bus when the first queue does not include data to be transmitted on the data bus.

10. The method of claim 9, wherein the data transfer time cycles are of a predetermined length.

11. The method of claim 9, wherein the highest priority traffic classification is associated with a minimum data transfer rate, and wherein transmitting the data packets from the first queue and the different queue to a host device comprises placing data from the first queue on the data bus at a rate equal to or greater than the minimum data transfer rate.

12. The method of claim 9, wherein determining a traffic classification of the data packets comprises determining the traffic classification based on virtual channel information included in an asynchronous transfer mode packet header.

13. The method of claim 12, wherein determining a traffic classification of the data packets comprises comparing the virtual channel information included in the asynchronous transfer mode packet header to virtual channel information stored in a storage device.

14. A method comprising:
receiving data packets to be transmitted to a network using a peripheral device included in a computer system;
determining a traffic classification of the data packets, the traffic classification based at least in part on at least one of a virtual channel identifier and a virtual path identifier of a data packet;
storing, in a memory, a priority level associated with virtual channel information of a data packet;
if the traffic classification of the data packets is a highest priority traffic classification, placing the data packets in a first queue of a plurality of queues;
if the traffic classification of the data packets is not the highest priority traffic classification, placing the data packets in a different queue of the plurality of queues; and
transmitting the data packets from the first queue and the different queue to the peripheral device; wherein the transmitting comprises:
during each of a plurality of data transfer time cycles, placing at least some data from the first queue on a data bus in communication with the plurality of queues and the peripheral device until the first queue does not include data to be transmitted to the peripheral device, and placing data from the different queue on the data bus when the first queue does not include data to be transmitted on the data bus.

15. The method of claim 14, wherein the highest priority traffic classification corresponds to time sensitive data generated in the computer system.

16. The method of claim 15, wherein the time sensitive data is voice data.

17. The method of claim 15, wherein the time sensitive data is video data.

18. The method of claim 14, wherein the data is received from a host processor.

* * * * *